United States Patent
Ongkiehong et al.

Patent Number: 5,309,406
Date of Patent: May 3, 1994

[54] METHOD OF PROCESSING SEISMIC DATA

[75] Inventors: Leo Ongkiehong, Wassenaar; Nicolaus A. Kinneging, Pijnacker; Hendricus L. H. Delfgauw, Delfgauw; Adrianus J. W. Duijndam, Nijmegen, all of Netherlands

[73] Assignee: Lucas Industries Public Limited Company, Solihull, England

[21] Appl. No.: 968,516

[22] Filed: Oct. 29, 1992

[30] Foreign Application Priority Data

Nov. 8, 1991 [GB] United Kingdom ............... 9123750

[51] Int. Cl.$^5$ ............................................. G01V 1/28
[52] U.S. Cl. ........................................ 367/73; 367/38
[58] Field of Search ................ 367/38, 56, 73, 23

[56] References Cited

U.S. PATENT DOCUMENTS 4,916,615 4/1990 Chittineni ............................. 367/73

Primary Examiner—Ian J. Lobo
Attorney, Agent, or Firm—Jacobson, Price, Holman & Stern

[57] ABSTRACT

A method of processing seismic data wherein seismic data signals having a first part which shows a slow variation in offset and a second part which shows a slow variation in midpoint, is modelled using a model which allows the two parts to be separated. The individual parts may be reconstructed from the model. One of the parts corresponds to offset dependent noise and can be effectively removed from the seismic data.

15 Claims, 6 Drawing Sheets

$k_x$ : midpoint wavenumber $k_h$ : offset wavenumber

1: offset-independent part of seismic response (signal)

2: offset-dependent/midpoint independent part (noise)

FIG. 5 ESTIMATED SIGNAL

METHOD OF PROCESSING SEISMIC DATA

BACKGROUND OF THE INVENTION

The present invention relates to a method of processing seismic data. Such a method may be used for marine seismic data or land seismic data and for two dimensional or three dimensional data.

In seismic exploration, seismic data are gathered by actuating one or more sources of seismic energy and recording at one or more locations reflected seismic energy so as to provide information about the reflective boundaries below the surface of the earth. For instance, in the case of a typical marine seismic exploration, a seismic source comprising one or more air guns or the like and a seismic streamer comprising hydrophones spaced regularly along a cable are towed behind an exploration vessel. The source is periodically actuated or fired and the reflected pressure variations detected by the hydrophones are recorded as individual traces. The data are therefore in the form of a large number of traces which are stored and subsequently processed using various techniques.

The traces are normally re-ordered or arranged into common mid-point gathers. The midpoint is the middle of a straight line extending from the source to the receiving transducer for the trace, so that all traces having the same mid point are grouped together and are sorted as a function of offset i.e. the distance between the source and the receiver. The travel times of the incident and reflected waves vary for different offsets, and this is corrected by means of normal move out (NMO) correction. Optionally, dip move out (DMO) correction is applied so as to compensate for non-horizontal reflective boundaries beneath the surface of the earth. The corrected traces are then "stacked" i.e. added together for each common mid-point gather, resulting in one stacked trace per common mid-point position.

For a three dimensional exploration giving information about a volume of the earth below the surface, the reflected seismic wave field may be considered as a five dimensional space having two spatial coordinates for the mid-point, one spatial coordinate for the offset, one spatial coordinate for the offset direction or azimuth, and a time coordinate. Instead of offset and azimuth coordinates, the offset may be defined in terms of spatial i.e. cartesian coordinates. For a two-dimensional exploration of a vertical slice through the earth, the mid-point and offset may each be defined by a single spatial coordinate so that three dimensional space is sufficient. The seismic wavefield is normally sampled at regular discrete time intervals and irregular discrete mid-points and offsets.

The reflected seismic wave field after NMO correction may comprise three parts. The first part depends on the mid-point position and varies only slowly with offset. A second part depends on the offset and varies only slowly with mid-point position. The third part comprises the rest of the seismic wavefield.

All three parts of the seismic wavefield contain useful information. The first part provides useful seismic information about the structure of the earth. The second part comprises offset-dependent or shot-generated noise whereas the third part contains all other types of noise. The second part includes the major types of noise in the seismic wavefield, such as noise from waves which propagate horizontally along the surface e.g. "ground roll" for land data.

BRIEF SUMMARY OF THE INVENTION

It is an object of the invention to provide a method of processing a plurality of input seismic data samples having a plurality of mid-points and a plurality of offsets. This method includes selecting a sample parameter of each of the input seismic data samples, defining at least one modeling function having at least one parameter, a first part which is substantially independent of the offsets of the input seismic data samples and a second part which is substantially independent of the mid-points of the input seismic data samples, and selecting the at least one parameter of the at least one modeling function so that the at least one modeling function represents a best fit to the selected sample parameters.

BRIEF DESCRIPTION OF THE DRAWINGS

The invention will now be described in detail with reference to the accompanying drawings wherein:

FIG. 1 of the accompanying drawings illustrates the different parts of the recorded seismic data for a two dimensional exploration. This drawing illustrates the mid-point wave number against the offset wave number corresponding to one time slice or frequency component in the two dimensional measured wavefield. For a three dimensional exploration, both the midpoint wave number axis and the offset wave number axis would have to be extended to two dimensions. The first part 1 of the wavefield is located around the mid point wave number axis with small offset wave numbers corresponding to slow variations in the offset direction. An offset wave number equal to zero corresponds to no variation against offset. The part 2 of the wave field representing offset-dependent noise is located around the offset-wave number axis with only small mid-point wave numbers corresponding to slow variations in the mid-point direction.

FIG. 2 of the accompanying drawings illustrates a special case in which the signal part 1 is independent of offset and the noise part 2 is independent of midpoint. For this special case, the rectangles shown in FIG. 1 reduce to line segments on the respective axis.

FIG. 3 of the accompanying drawings illustrates a case where DMO correction has not been applied. For larger mid-point wavenumbers, no perfect alignment in the offset direction occurs. The signal is thus contained in the "bow tie" shaped part 1 of FIG. 3.

Figure 1:
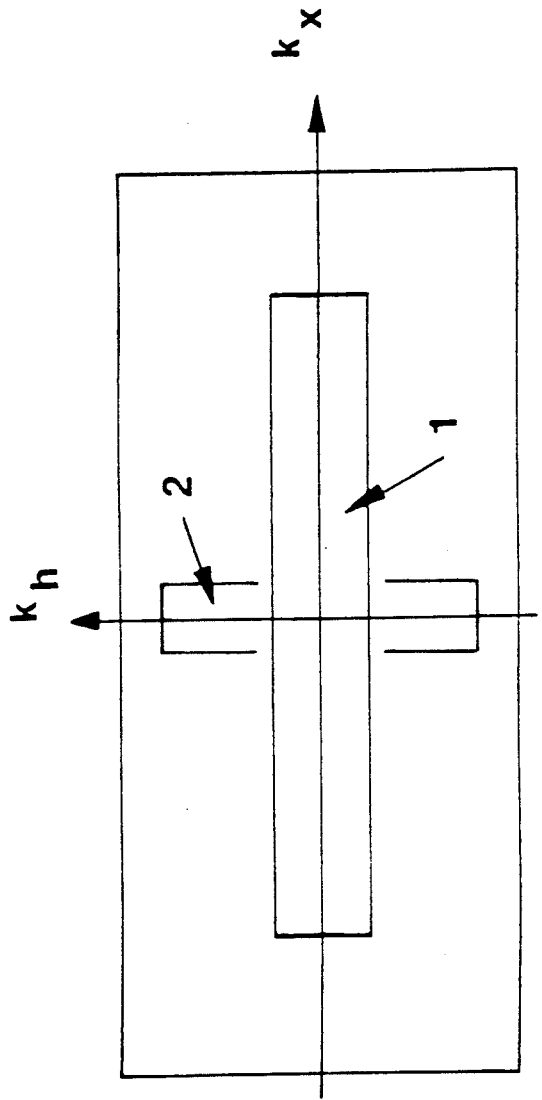
FIG. 1 is a diagrammatic illustration of the different parts of the recorded seismic data for a two-dimensional exploration.

The stacking of common midpoint traces does not affect the signal part of the data because this part does not vary with offset. In the case of a common midpoint gather containing a continuous range of offsets, the offset dependent noise is cancelled by the stacking operation so that it is substantially suppressed. Thus, the signal-to-noise ratio of stacked data is improved over unstacked data. However, if a common midpoint gather does not contain a continuous range of offsets, the offset-dependent noise is not fully cancelled so that a substantial amount of this noise remains in the stacked traces. The phenomenon is caused by a so-called "leaking stack operator".

An example of "sparsely sampled data sets" with a non-continuous offset range for each common midpoint gather occurs in two dimensional exploration where the source interval is different from the receiver interval. If the source spacing or interval is different from a multiple of the receiver spacing or interval, the spacing between the mid-points is smaller than half the receiver interval. Further, for three dimensional exploration, all three dimensional data for land as well as for marine data are sparsely sampled in the offset direction.

According to the invention, there is provided a method of processing a plurality of input seismic data samples having a plurality of mid-points and a plurality of offsets, by selecting a sample parameter of each of the input seismic data samples; defining at least one modelling function having at least one model parameter and comprising a first part which is substantially independent of the offsets of the input seismic data samples and a second part which is substantially independent of the mid-points of the input seismic data samples; and selecting the at least one parameter of the at least one modelling function such that the at least one modelling function represents a best fit to the selected sample of the input seismic data samples.

The at least one modelling function may comprise at least one first modelling function which is substantially independent of the offsets of the input seismic data samples and at least one second modelling function which is substantially independent of the mid-points of the input seismic data samples.

In a first embodiment the selected samples may comprise the value of each input seismic trace at a predetermined time. In a second embodiment, the selected sample may comprise temporal Fourier coefficients of the input seismic data, thereby selecting input seismic data at a predetermined frequency.

The modelling functions may comprise sinc functions. As an alternative, the modelling functions may comprise sine and/or cosine functions. In one embodiment, sinc functions may be used as the first modelling functions for common offset traces whereas the second modelling functions for the common mid-point traces may comprise sine and cosine functions. Further, irregular mid-points and offsets may be replaced by spatially regularly sampled data by employing the techniques disclosed in British Patent Application No. 9111145.0 filed on May 23, 1991.

The step of selecting the first and second parameters amounts to a "parametric inversion scheme" and any suitable scheme may be employed, such as the well-known least squares inversion where the first and second parameters are chosen such that the sum of the squares of the differences between the modelled parameters and the selected sample parameters are minimized.

Such a method may be applied to two dimensional data and two three dimensional data, and may be preceded by NMO correction and DMO correction.

The method may further comprise constructing output data samples from the at least one first modelling function. The output data samples may be used in place of the input seismic data samples and are substantially free from offset-dependent noise.

The method may further comprise constructing offset dependent noise samples from the at least one second modelling function. The offset-dependent noise samples may be subtracted from the input seismic data samples so as to remove the effects of offset-dependent noise.

The output data samples and the offset-dependent noise samples may be subtracted from the input seismic data samples so as to produce non-offset dependent noise samples, which may contain information of interest.

The method may further comprise stacking the output data samples having common mid-points. Other processing techniques may then be applied, such as pre-stack or post-stack migration.

It is thus possible to provide a method which is capable of separating the different parts of the seismic response from sparsely sampled data. Such a method uses all traces in an area to form a continuous range of offsets and uses the actual mid-point positions of these traces to separate the offset-dependent part of the data from the part which is independent of offset. By using the continuous range of offsets in this area, the offset-dependent noise can be effectively eliminated.

Figure 4:
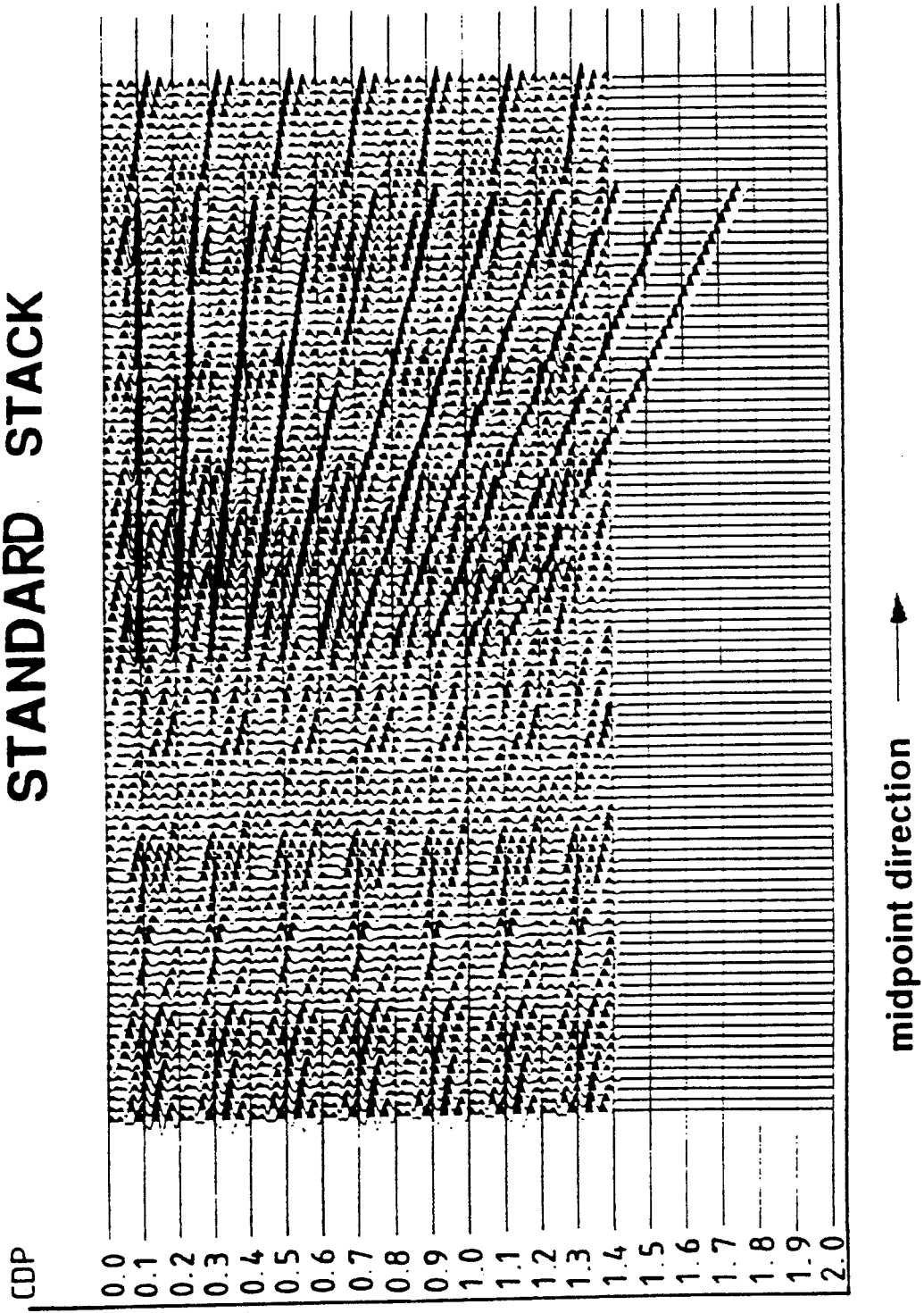
FIG. 4 is a diagrammatic illustration of a stack based on synthetic input data for a sparsely sampled seismic survey showing the affect of a leaking stack operator.
Figure 5:
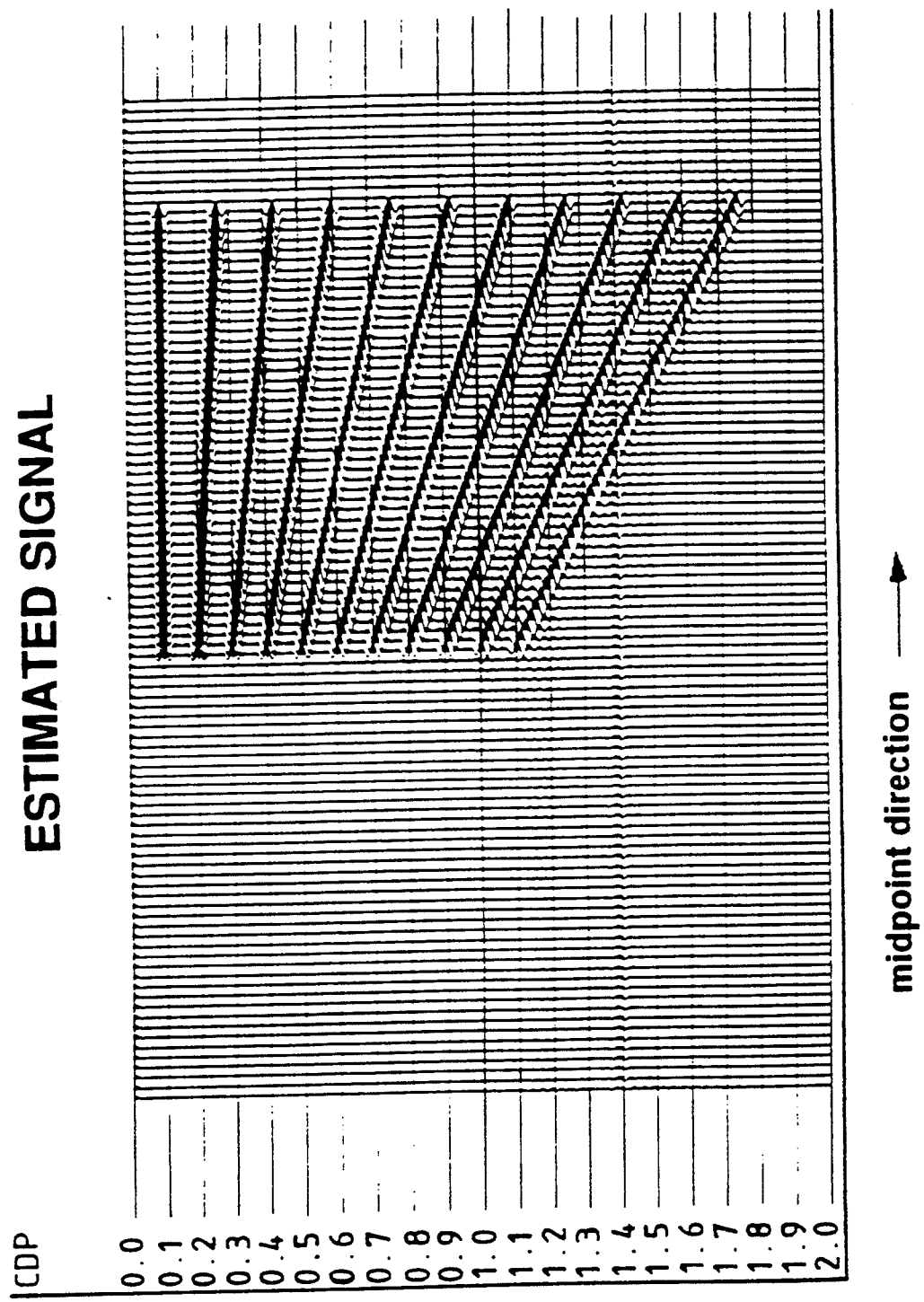
FIG. 5 is a diagrammatic illustration of a signal determined from the synthetic input data by the method of this invention.
Figure 6:
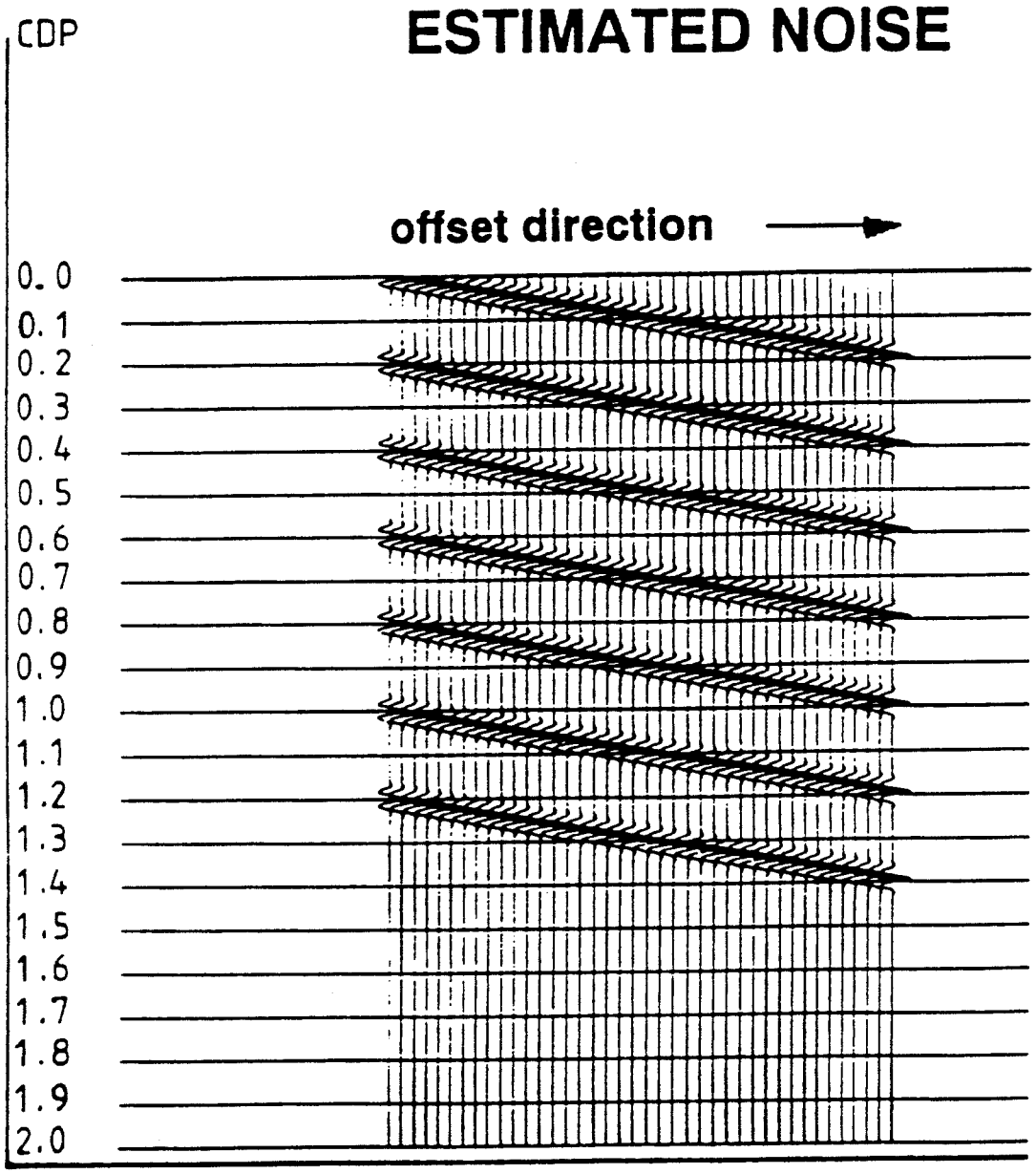
FIG. 6 is a diagrammatic illustration showing offset-dependent noise determined from the synthetic input data according to an embodiment of the invention.

The present invention will be further described, by way of example, with reference to FIGS. 4 to 6 of the accompanying drawings, in which:

FIG. 4 illustrates a stack, based on synthetic input data for a sparsely sampled seismic survey with offset-dependent noise and a signal comprising eleven reflections, illustrating the effect of a leaking stack operator;

FIG. 5 illustrates a signal determined from the synthetic input data by a method constituting an embodiment of the invention; and FIG. 6 illustrates offset-dependent noise determined from the synthetic input data by a method constituting an embodiment of the invention.

Seismic data acquired during exploration are arranged into common mid-point gathers, each of which contains a plurality of recorded traces with discontinuous irregularly spaced offsets. The traces in each common mid-point gather are then subjected to NMO correction and optionally to DMO correction.

Each of the corrected samples representing the seismic wavefield has a part which varies only slowly with offset and represents the signal part. The offset-dependent part of each sample which is substantially independent of mid-point represents the offset-dependent noise. In order to separate the signal and noise parts, it is assumed that the signal part is substantially independent of offset and depends only on the geology of the part of the earth being explored. Thus, the signal part is dependent on the common mid-point position with only smooth variations in the offset direction. Similarly, the offset-dependent part is substantially independent of common mid-point position with only smooth variations of noise with respect to common mid-point position.

It is thus possible to construct a "forward model" which describes data composed of signal and offset-dependent noise with a plurality of modelling functions containing selectable parameters. By appropriately selecting the parameters, the modelling functions can be used to calculate the data for any mid-point position and offset in the area and offset range of interest. The model makes estimates of the input traces which have been recorded and corrected at the actual mid-point positions and offsets of these traces, which may be irregularly sampled. The estimated traces are compared with the input traces and the parameters of the modelling functions are adjusted so as to obtain the "best fit" or approximation to the recorded and corrected data.

Various modelling functions may be used in order to construct the forward model. For instance, the modelling functions may comprise sinc-functions at different regular positions, in which case, the parameters are the amplitudes of the sinc-functions at regular mid-point positions or offsets. Alternatively, the modelling functions may be sine or cosine functions with different frequencies. The parameters then comprise the Fourier coefficients in the mid-point or offset domain. The modelling functions may comprise a combination of two different types of functions, for instance with one type, such as the sinc functions, describing the signal part and the other type, such as the sine and cosine functions, describing the noise part.

The arguments of the modelling functions depend on the possibly irregular, mid-point positions and offsets of the measured seismic traces.

Thus, parameters of the forward model can be estimated from the input traces using the actual mid-point positions and offset positions, which may be irregularly sampled. The parameters are chosen such that the estimates produced by the model provide the best fit to the actual input traces. The instantaneous amplitudes or values of the input traces at predetermined times corresponding to a time slice through the input traces, or the temporal frequency components, are estimated and compared with the actual values. The process is repeated for each time slice or each frequency component so as to build up a complete estimate of the wavefield. These techniques may also be applied to a number of time slices or frequencies simultaneously.

Figure 2:
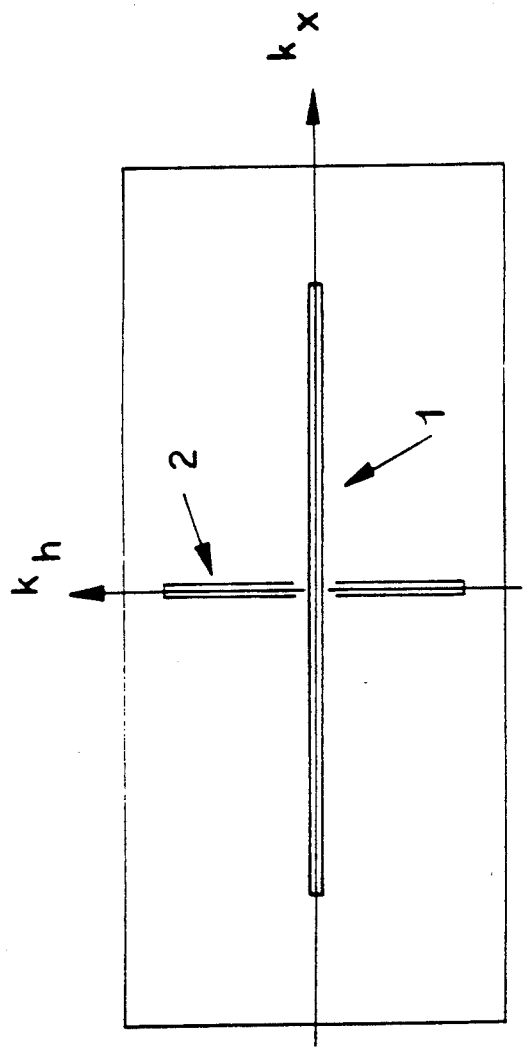
FIG. 2 is a diagrammatic illustration of a special case showing signal part 1 as being independent of offset and the noise part 2 as being independent of the mid-point.
Figure 3:
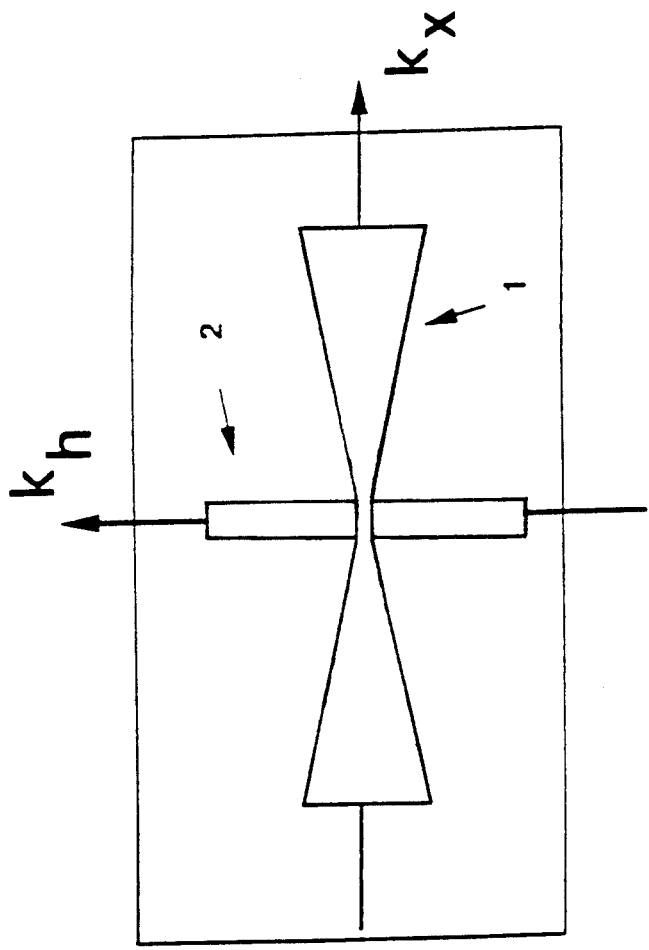
FIG. 3 is a diagrammatic illustration showing a case where DMO correction has not been applied.

The parameters of the forward model are estimated by any suitable parametric inversion scheme. In such schemes, the mis-match between the actual data and the data modelled with the currently chosen parameters is minimised. For instance, in the well-known least squares inversion algorithm, the sum of the squared difference between input data and estimated data is minimised. The modelling functions which are chosen to fit the input data have a wave number spectrum comprising the parts 1 and 2 shown in any of FIGS. 1 to 3.

The forward model can be written as a matrix multiplication:

$$y(x,h) = A_1 g_s + A_2 g_n$$

where x is midpoint position, h is offset, y(x,h) is a vector containing the seismic data for all input traces, $g_s$ is a vector containing the parameters of a first (signal) modelling function, $g_n$ is a vector containing the parameters of a second (noise) modelling function, the matrix $A_1$ contains the signal modelling function whose arguments depend on midpoint positions of the measured seismic data, and the matrix $A_2$ contains the noise modelling functions whose arguments depend on the offsets of the measured seismic data.

The two matrix multiplications can be combined into one matrix multiplication:

$$y = Ag = (A_1|A_2)\left(\frac{g_s}{g_n}\right)$$

where g now contains the parameters of both the first and second modelling functions.

Using the least squares inversion, the parameters can be determined by:

$$g' = (A^T A)^{-1} A^T y$$

$$\left(\frac{g'_s}{g'_n}\right) = (A_1^T A_1 + A_2^T A_2)^{-1}\left(\frac{A_1^T}{A_2^T}\right)y$$

thus separating the estimated signal parameters $g'_s$ from the estimated noise parameters $g'_n$. Output traces representing the signal and the off-set dependent noise can then be constructed from the parameters $g'_s$ and $g'_n$, respectively.

It is thus possible to extract from input seismic data samples the signal part (FIG. 5) of the seismic wavefield and the offset-dependent noise (FIG. 6). In particular, for each combination of mid-point position and offset, the signal and offset dependent noise contributions can be calculated separately. This information may then be used in various different ways. For instance, a signal can be estimated which varies with mid-point and also varies slowly with offset. Such data can then be further processed as prestack data prior to stacking.

The signal as a function of mid-point position can be generated and used for further processing. Such data are comparable to the standard stacked data, where the effect of the leaking stack operator has been eliminated. Further, such data can be generated for regular spatial sampling irrespective of whether the input data was irregularly sampled.

The offset-dependent noise can be subtracted from the original input traces. This provides prestack data with a better signal-to-noise ratio, which may then be subjected to further prestack processing. Also, it is possible to examine the offset-dependent noise separately.

In a further technique, the estimated signal and the estimated offset-dependent noise can be subtracted from the original input data. The result of this is to reveal all of the noise which is not modelled by the forward model. Analysis of the signal, offset-dependent noise, and other noise may give more insight into the information content of the acquired seismic data.

These techniques may be applied both to two dimensional and to three dimensional seismic data and to both marine and land seismic data. The techniques may be applied immediately after NMO correction and, when performed, DMO correction, with the signal part in the form of output traces being used in subsequent processing in place of the corrected input traces. The techniques of standard migration and prestack migration may be applied to the output data, or the data may be stacked and then subjected to post stack migration.

We claim:

1. A method of processing a plurality of input seismic data samples having a plurality of midpoints and a plurality of offsets, comprising:

selecting a sample of each of the input seismic data samples;

defining at least one modelling function having at least one model parameter and comprising a first part which is substantially independent of the offsets of the input seismic data samples and a second part which is substantially independent of the midpoints of the input seismic data samples; and selecting the at least one model parameter of the at least one modelling function such that the at least one modelling function represents a best fit to the selected sample of the input seismic data samples.

2. A method as claimed in claim 1, in which the selected sample comprises the value of each input seismic data sample at a predetermined time.

3. A method as claimed in claim 1, in which the selected sample comprises temporal fourier coefficients of the input seismic data.

4. A method as claimed in claim 1, in which the at least one modelling function comprises at least one first modelling function which is substantially independent of the offsets of the input seismic data samples and at least one second modelling function which is substantially independent of the midpoints of the input seismic data samples.

5. A method as claimed in claim 4, in which the modelling functions comprise sinc functions.

6. A method as claimed in claim 4, in which the modelling functions comprise at least one function selected from the group consisting of sine and cosine functions.

7. A method as claimed in claim 4, in which sinc functions are used as the first modeling functions for common offset traces and the second modelling functions for the common midpoint traces comprise at least one function selected from the group consisting of sine and cosine functions.

8. A method as claimed in claim 4, further comprising constructing output data samples from the at least one first modelling function.

9. A method as claimed in claim 4, further comprising constructing offset dependent noise samples from the at least one second modelling function.

10. A method as claimed in claim 9, in which the offset dependent noise samples are subtracted from the input seismic data samples so as to remove the effects of offset dependent noise.

11. A method as claimed in claim 8, further comprising constructing offset dependent noise samples from the at least one second modelling function and subtracting the output data samples and the offset dependent noise samples from the input seismic data samples so as to produce non-offset dependent noise samples.

12. A method as claimed in claim 8, further comprising stacking the output data samples having common midpoints.

13. A method as claimed in claim 1, in which the parameters are selected in accordance with a least squares scheme.

14. A method as claimed in claim 1, in which the seismic data is two dimensional data.

15. A method as claimed in claim 1, in which the seismic data is three dimensional data.

* * * * *